May 26, 1953 P. SPENCE 2,639,556
PILOT OPERATED REGULATING VALVE
Filed July 9, 1947
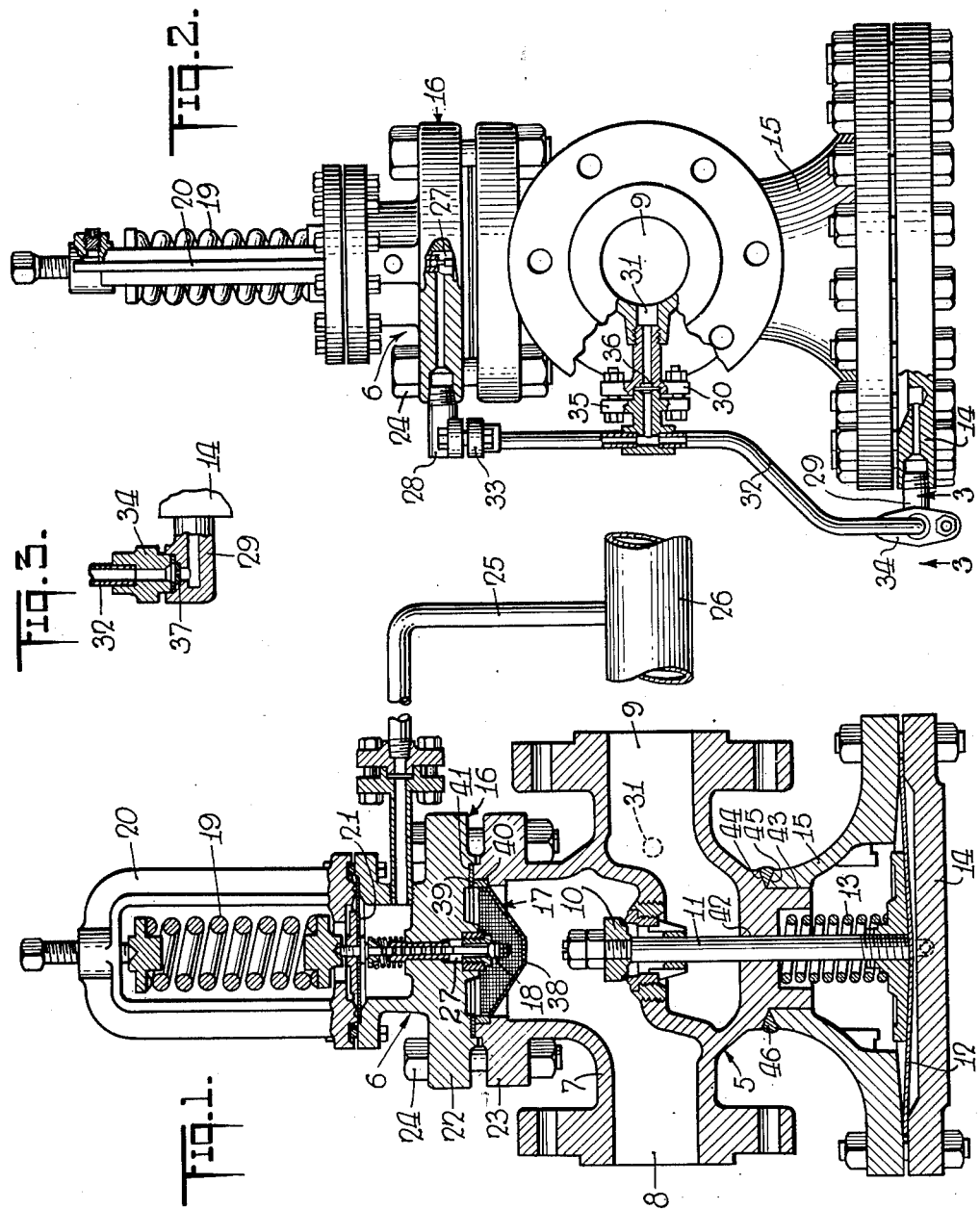
INVENTOR
*Paulsen Spence*
BY
ATTORNEYS Patented May 26, 1953

2,639,556

UNITED STATES PATENT OFFICE 2,639,556

PILOT OPERATED REGULATING VALVE

Paulsen Spence, Baton Rouge, La., assignor to Spence Engineering Company, Inc., Walden, N. Y., a corporation of New York Application July 9, 1947, Serial No. 759,809

6 Claims. (Cl. 50—12)

My invention relates to valves and in particular to an improved pressure-regulating valve.

It is an object of the invention to provide an improved valve of the character indicated.

It is another object to provide an improved regulating valve construction having features of ruggedness, adaptability, and quick and easy servicing.

Other objects and various further features of the invention will be pointed out or will occur to those skilled in the art from a reading of the following specification in conjunction with the accompanying drawings. In said drawings:

Fig. 1 is a front vertical sectional view through a valve incorporating features of the invention;

Fig. 2 is a partly broken-away side view of the valve of Fig. 1; and

Fig. 3 is a fragmentary sectional view taken substantially in the plane 3—3 of Fig. 2.

Briefly stated, my invention contemplates an improved regulator construction embodying a pilot valve in unit-assembled relation with a main valve. The pilot valve may be incorporated into the customary cover or bonnet over the bonnet opening on the high-pressure side of the main valve. In the specific form to be described, bleeds from the pilot valve to the low-pressure side of the main valve and from the pilot valve to the pressure-responsive actuator for the main valve are included in readily detachable connections to a single pipe, for ready servicing. A novel arrangement is provided for strainer means to assure reliable pilot operation.

Referring to the drawings, my invention is shown in application to a regulator-valve assembly comprising a main valve 5 and a pilot valve 6. The main valve includes a body 7 having an inlet or high-pressure side 8 and an outlet or low-pressure side 9. A main valve member 10 is positioned to control flow through the valve 5 and in the form shown is actuated (through a stem 11) by fluid pressure-responsive means in the form of a diaphragm 12. The valve-stem side of diaphragm 12 is preferably in fluid communication with the low-pressure side of valve 5, as by means of a loose fit of valve stem 11 in its guide 42. The valve member 10 may be resiliently urged to a normal seated position by spring means 13, and the valve member 10 may be actuated against the force of spring means 13 by pilot-admitted fluid pressures in the space between diaphragm 12 and the hood 14 under the base 15 of the main valve.

In accordance with the invention, the pilot valve 6 is formed in or carried by the cover or bonnet 16 usually provided over the bonnet opening 17 on the high-pressure side of main valve 5. In the form shown, the construction of pilot 6 includes a pilot valve member 18 normally urged in an open direction by resilient means 19, shown adjustably supported within a cowl yoke 20. Pressure-responsive means in the form of a diaphragm 21 is positioned to oppose the force of spring 19 and thus to control the placement of the pilot valve member 18. Since the pilot valve 6 is incorporated in the bonnet or cover 16, it may be readily mounted upon and removed from the main valve 5. In the form shown, opposing flanges 22—23 of the bonnet 16 and of the valve body 7, respectively, are secured by bolts, as at 24.

For the type of pilot valve 6 and main valve 5 shown, pressure-regulating functions may be obtained by providing fluid-communicating means from the low-pressure side of the pilot valve member 18 to the fluid-pressure-actuated means 12 for the main valve, and by providing a bleed connection from the low-pressure side of the pilot valve member 18 to the low-pressure side of the main valve 5. Desired flow control may be effected by supplying control pressures under the diaphragm 21, and in the form shown such regulation is effected by a pipe connection 25 from a part 26 of the downstream line supplied by the outlet 9 of the main valve. It will be clear that until the desired regulated pressure is developed at the low-pressure side 9 of the main valve there will be insufficient control pressure in pipe 25 to force a seating of pilot valve member 18. High pressure will, therefore, be supplied to the pressure-responsive means 12 for maintaining the main valve member 10 open. When the control pressure in pipe 25 is sufficiently great, the force on diaphragm 21 will cause closure of the pilot valve 6. High pressure under the main valve diaphragm 12 may then bleed into the low-pressure side 9 of the main valve, and such bleeding will be understood to permit resilient means 13 to seat valve member 10 until such time as the desired regulated pressure falls off on the low-pressure side of the main valve.

In accordance with the invention, the fluid-communication means generally indicated for connecting the pilot valve to the pressure-responsive means 12 and to the low-pressure side of main valve may be formed as a single unit, readily detachable for quick and easy servicing. In the form shown, the low-pressure side 27 of the pilot valve 6 terminates outside the bonnet 16 in a readily detachable flanged connector 28.

Similarly, the pressure-responsive means 12—14 terminates in a readily detachable flanged connector 29 carried by the hood 14. A similar flanged connector may also provide a fluid connection to the outlet side 9 of the main valve, as at 31. Preferably, all connectors 28—29—30 are more or less aligned and face toward the same side of the regulator valve assembly. Such alignment will be understood to permit ready attachment to a single pipe line 32, fitted at each end with connectors 33—34 to be secured to connectors 28—29, respectively, and including at an intermediate portion a further connector 35 for association with the connector 30. The bleed means between the pilot valve 6 and the outlet or low-pressure side 9 of the main valve preferably comprises a bleed orifice in the form of a readily insertable orifice element 36 removably held by one of the connectors 30—35 and immediately exposed when the connection 30—35 is opened.

If desired, for the protection of diaphragm 12 against sudden pressure surges on the inlet side of the main valve, a bleed member 37 similar to bleed orifice 36 may be removably inserted in one of the connector members 29—34 adjacent the pressure-responsive means 12.

It will be clear that with the arrangement described the mere uncoupling of connectors 28—33, 35—30, and 29—34 will serve completely to release control pipe 32 and to make the bleed members 36—37 immediately available for cleaning, servicing or replacement.

In accordance with the invention, even though the pilot valve member 18 is carried by the bonnet 16 and projects into the inlet or high-pressure side 8 of the main valve, it may be fully protected for free and uniform pressure regulation by screen means 38 between valve member 18 and valve member 10. In the form shown, the screen means 38 is a wire basket of sufficiently fine mesh to strain the fluid within the valve and to intercept foreign matter. The basket 38 may be welded or otherwise peripherally secured to a mounting ring 39 seated against an annular shoulder 40 at the lip of the bonnet opening 17. Preferably, the depth of the ring 39 coincides with the depth of the cut for shoulder 40 so that the gasket 41 or other sealing member between bonnet 16 and the main valve body 7 may sealingly overlap parts of the body 7 and of the ring 39. It will be clear that with such a sealing arrangement the ring 39 may be made loosely to fit in the body 7 so as to permit ready removability for cleaning purposes, without impairing the sealing fit of the gasket 41 over the ring 39 and over the body 7.

In accordance with the invention, the base 15 which is utilized to support the pressure-responsive means 12—14 for the main valve is formed separately from the valve body 7 and is secured thereto by means including interfitting surfaces to assure concentric alignment of the valve stem 11 with the guide 42, and with the valve member 10 and its seat. In the form shown, this alignment is possible through the formation of a cylindrical surface 43 outside the valve body 7 concentric with the guide 42. The surface 43 slidably receives a cylindrical bore formed in the base 15. The adjacent shoulders 44—45 of the interfitting parts of the base 15 and the body 7 may be chamfered or bevelled so as to accommodate a circumferential weld 46 for sealingly securing the base 15 to the body 7. It will be understood that the axial extent of the interfitting surfaces at 43 may be such as to assure concentric alignment of the displaceable parts of the main valve and that the weld 46 may not only maintain this alignment but also effectively seal the space beneath (i. e. the low-pressure side of) the diaphragm 12.

It will be appreciated that I have described a novel and useful valve construction particularly applicable to regulating valves. The construction embodying these novel features provides simplicity of parts and the utmost in ease of access to all parts requiring servicing.

While I have described my invention in detail for the preferred form shown, it will be understood that modifications may be made within the scope of the invention as defined in the appended claims.

I claim:

1. In a regulating valve, a valve body having an inlet opening and an outlet opening, a main valve member for controlling flow between said openings, pressure-responsive means carried by said body and connected for actuating said main valve member, said body having a single bonnet opening communicating with said inlet opening and overstanding said main valve member, and a unit pilot-valve and bonnet for said opening, said unit including a pilot-valve member on the bottom thereof and directly exposed in said bonnet opening whereby said pilot-valve member may be directly exposed to the inlet opening of said main valve when said unit is applied to said bonnet opening, said unit further including pressure-responsive means for said pilot-valve member, connecting means on said unit for connecting the low-pressure side of said pilot-valve member to said first-mentioned pressure-responsive means, and bleed-connecting means on said unit for bleeding the low-pressure side of said pilot-valve member to the outlet side of said body.

2. In combination, a main-valve unit having an inlet side and an outlet side with a valve member therebetween and unitarily including pressure-responsive actuating means for said member, said valve having a bonnet opening, first externally accessible detachable fluid-communicating connector means communicating with said outlet side for discharging pilot-admitted pressure fluid to said outlet side, and second externally accessible detachable fluid-communicating connector means communicating and in actuating relation with said pressure-responsive means for admitting pilot-controlled fluid pressure in actuating relation with said pressure-responsive means and therefore with said valve member; a bonnet unit including means for removable attachment to said main-valve unit at the bonnet opening thereof, a pilot valve unitarily carried by said bonnet unit and including a member projecting into said main-valve opening when said bonnet unit is secured to said main-valve unit, and third externally accessible fluid-communicating connector means communicating with the downstream side of said pilot-valve member and unitarily carried by said bonnet unit whereby pilot-controlled pressure fluid may be made available at said third connector means; and a single fluid-communicating interconnection unit including separate detachable means for external detachable connection to all three of said externally accessible fluid-communicating connector means, whereby upon detachment of said interconnection unit, all said fluid-communicating means may be readily cleaned.

3. The combination of claim 1, in which a removable bleed-orifice member is held in said first connector means when attached to said interconnection unit.

4. The combination of claim 1, in which a removable bleed-orifice member is held in said second connector means when attached to said interconnection unit.

5. In combination, a main-valve unit having an inlet side and an outlet side with a valve member therebetween and unitarily including pressure-responsive actuating means for said member, said valve having a bonnet opening and a first straight fluid-communicating passage from said outlet side and open exteriorly of said main-valve unit, a readily detachable connector fitting at the exterior end of said first passage, said main-valve unit also having a second straight fluid-communicating passage from said pressure-responsive means and open exteriorly of said main-valve unit, and a readily detachable connector fitting at the exterior end of said second passage; a bonnet unit including means for removable attachment to said main-valve unit at the bonnet opening thereof, a pilot valve unitarily carried by said bonnet unit and including a member within said main-valve opening when said bonnet unit is secured to said main-valve unit, said bonnet unit having a third fluid-communicating passage from the downstream side of said pilot-valve member and open exteriorly of said bonnet unit, and a readily detachable connector fitting at the exterior end of said third passage; and fluid-communicating means exterior of said units and detachably interconnecting said passages at said fittings.

6. In combination, a valve assembly comprising a main valve and a pilot valve rigidly supported with the pilot valve within the inlet opening of the main valve, fluid-pressure actuating means including separate diaphragms for said valves, a first straight fluid passage open over one of said diaphragms, a second straight fluid passage open over the other of said diaphragms, a third straight fluid passage open to the downstream side of one of said valves, a fourth straight fluid passage open to the downstream side of the other of said valves, said passages being separately open exteriorly of said assembly, and readily detachable fluid-communicating means interconnecting the exterior ends of the three of said passages to said main-valve diaphragm and to the downstream sides of said valves.

PAULSEN SPENCE.

References Cited in the file of this patent

UNITED STATES PATENTS

| Number | Name | Date |
|---|---|---|
| 217,013 | Lewis | July 1, 1879 |
| 625,520 | Sauer | May 23, 1899 |
| 966,150 | Woodridge | Aug. 2, 1910 |
| 1,000,729 | Gloeckler | Aug. 15, 1911 |
| 1,173,834 | Metzger | Feb. 29, 1916 |
| 2,155,170 | Odend'hal | Apr. 18, 1939 |
| 2,185,713 | Spence | Jan. 2, 1940 |
| 2,347,676 | Eplett | May 2, 1944 |
| 2,370,110 | Spence | Feb. 20, 1945 |

FOREIGN PATENTS

| Number | Country | Date |
|---|---|---|
| 2,977 | Great Britain | of 1904 |